US009148920B2

(12) United States Patent
Kao et al.

(10) Patent No.: US 9,148,920 B2
(45) Date of Patent: Sep. 29, 2015

(54) LIGHT EMITTING DIODE DRIVING APPARATUS CAPABLE OF DETECTING WHETHER CURRENT LEAKAGE PHENOMENON OCCURS ON LED LOAD AND LIGHT EMITTING DIODE DRIVING METHOD THEREOF

(71) Applicant: Beyond Innovation Technology Co., Ltd., Taipei (TW)

(72) Inventors: Chen-Lung Kao, Taipei (TW); Zhen-Chun Liu, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 0 days.

(21) Appl. No.: 14/221,287

(22) Filed: Mar. 21, 2014

(65) Prior Publication Data

US 2015/0022103 A1 Jan. 22, 2015

(30) Foreign Application Priority Data

Jul. 22, 2013 (TW) ............................ 102126134 A

(51) Int. Cl.
*H05B 33/08* (2006.01)

(52) U.S. Cl.
CPC .................................. *H05B 33/0815* (2013.01)

(58) Field of Classification Search
CPC ...................................................... H05B 37/02
See application file for complete search history.

(56) References Cited

U.S. PATENT DOCUMENTS

| | | | | |
|---|---|---|---|---|
| 5,806,055 | A * | 9/1998 | Zinda, Jr. | 706/45 |
| 7,550,934 | B1 * | 6/2009 | Deng et al. | 315/308 |
| 2012/0262070 | A1 * | 10/2012 | Oshima et al. | 315/130 |
| 2014/0333204 | A1 * | 11/2014 | Zhang et al. | 315/119 |

* cited by examiner

*Primary Examiner* — Tung X Le
*Assistant Examiner* — Raymond R Chai
(74) *Attorney, Agent, or Firm* — Jianq Chyun IP Office

(57) ABSTRACT

A light emitting diode (LED) driving apparatus and an LED driving method suitable for driving an LED load are provided. The LED driving apparatus includes a driving circuit, a feedback circuit, and a control chip. The driving circuit provides a driving voltage to one terminal of the LED load according to a pulse-width modulation (PWM) driving signal. The feedback circuit generates a feedback voltage according to a voltage on the other terminal of the LED load. The control chip is configured to generate the PWM driving signal and adjust the duty cycle of the PWM driving signal in response to the feedback voltage. If the control chip determines the PWM driving signal with a threshold duty cycle continues being output over a preset period of time, the control chip determines that the current leakage phenomenon occurs on the LED load and stops generating the PWM driving signal.

17 Claims, 7 Drawing Sheets

LIGHT EMITTING DIODE DRIVING APPARATUS CAPABLE OF DETECTING WHETHER CURRENT LEAKAGE PHENOMENON OCCURS ON LED LOAD AND LIGHT EMITTING DIODE DRIVING METHOD THEREOF

CROSS-REFERENCE TO RELATED APPLICATION

This application claims the priority benefit of Taiwan application serial no. 102126134, filed on Jul. 22, 2013. The entirety of the above-mentioned patent application is hereby incorporated by reference herein and made a part of this specification.

BACKGROUND OF THE INVENTION

1. Field of the Invention

The invention relates to a capacitive load driving technology, and more particularly, to a light emitting diode (LED) driving apparatus and an LED driving method.

2. Background

The boost converter, the buck-boost converter, or the buck converter based on the pulse-width modulation mechanism is generally used as the driving circuit in the existing LED driving apparatus. No matter which one of the above is used, the designers usually need to design some protection mechanisms to safeguard the driving stability of the LED load.

For example, the protection mechanisms, such as short circuit protection mechanisms or over-voltage protection mechanisms are generally adopted. Among these mechanisms, the short circuit protection of the LED component is to limit current to avoid the current caused by a short circuit from being too large, and the over-voltage protection is to limit voltages to avoid the driving voltage of the LED load from being too large.

However, among the existing protection mechanisms, there is no protection mechanism against the current leakage phenomenon of the LED load. Specifically, the so-called current leakage phenomenon may be caused by the broken connection lines in the LED load and the resultant short to ground or caused by the insulating abnormality of the LED string and the resultant short to ground. In the existing LED driving apparatus, the LED load is not protected from being affected by the above-mentioned situations, and therefore the large current induced by the current leakage phenomenon may do harm to the LED load.

SUMMARY

An exemplary embodiment of the invention provides an LED driving apparatus and an LED driving method capable of detecting whether the current leakage phenomenon occurs on the LED and thereby determining whether to start the current leakage protection mechanism or not.

The LED driving apparatus provided in an exemplary embodiment of the invention is suitable for driving an LED load. The LED driving apparatus includes a driving circuit, a feedback circuit, and a control chip. The driving circuit is coupled to the LED load and provides a driving voltage to one terminal of the LED load according to a pulse-width modulation (PWM) driving signal. The feedback circuit is coupled to the other terminal of the LED load and generates a feedback voltage according to a voltage on the other terminal of the LED load. The control chip is coupled to the driving circuit and the feedback circuit, and generates the PWM driving signal and adjusts a duty cycle of the PWM driving signal in response to the feedback voltage. If the control chip determines that the control chip continues outputting the PWM driving signal with a threshold duty cycle for a period of time, and the period of time exceeds a preset period of time, the control chip determines a current leakage phenomenon occurs on the LED load and stops generating the PWM driving signal.

In an exemplary embodiment of the invention, the LED load at least comprises an LED string. Under such a condition, either terminal of the LED string is short to ground when the current leakage phenomenon occurs on the LED load, so that the control chip adjusts the duty cycle of the PWM driving signal to the threshold duty cycle in response to the feedback voltage.

In an exemplary embodiment of the invention, the driving circuit is a boost converter or a buck-boost converter, and the control chip compares the feedback voltage with a preset voltage. If the feedback voltage is lower than the preset voltage, the control chip increases the duty cycle of the PWM driving signal to increase a step-up ratio of the driving circuit; if the feedback voltage is higher than the preset voltage, the control chip decreases the duty cycle of the PWM driving signal to decrease the step-up ratio of the driving circuit.

In an exemplary embodiment of the invention, when the duty cycle of the PWM driving signal is increased to the threshold duty cycle, the control chip starts to count a duration, and the duration is the period of time during which the control chip continues outputting the PWM driving signal with the maximum duty cycle.

In an exemplary embodiment of the invention, if the control chip determines that the duration exceeds the preset period of time, the control chip stops generating the PWM driving signal; if the control chip determines that the duration does not exceed the preset period of time, the control chip clears the count of the duration.

In an exemplary embodiment of the invention, the driving circuit is a buck converter, and the control chip compares the feedback voltage with a preset voltage. If the feedback voltage is lower than the preset voltage, the control chip decreases the duty cycle of the PWM driving signal to increase a step-down ratio of the driving circuit; if the feedback voltage is higher than the preset voltage, the control chip increases the duty cycle of the PWM driving signal to decrease the step-down ratio of the driving circuit.

In an exemplary embodiment of the invention, when the duty cycle of the PWM driving signal is decreased to the threshold duty cycle, the control chip starts to count a duration, and the duration is the period of time during which the control chip continues outputting the PWM driving signal with the minimum duty cycle.

In an exemplary embodiment of the invention, the control chip comprises a reset pin. When the control chip stops generating the PWM driving signal based on the determination of the current leakage phenomenon occurring on the LED load, the reset pin is triggered, such that the control chip re-starts to generate the PWM driving signal.

The LED driving method with a current leakage protection mechanism provided in an exemplary embodiment of the invention is suitable for driving an LED load. The LED driving method comprises: generating a pulse-width modulation (PWM) driving signal; providing a driving voltage to one terminal of the LED load according to the PWM driving signal; generating a feedback voltage according to a voltage on the other terminal of the LED load; adjusting a duty cycle of the PWM driving signal in response to the feedback voltage; determining whether a period of time during which the PWM driving signal with a threshold duty cycle continues being output exceeds a preset period of time, if yes, determining that the current leakage phenomenon occurs on the LED load and stopping generating the PWM driving signal.

In an exemplary embodiment of the invention, the LED load at least comprises an LED string. Under such a condition, either terminal of the LED string is short to ground when the current leakage phenomenon occurs on the LED load, such that the control chip adjusts the duty cycle of the PWM driving signal to a threshold duty cycle in response to the feedback voltage.

In an exemplary embodiment of the invention, the step of adjusting the duty cycle of the PWM driving signal in response to the feedback voltage comprises: comparing the feedback voltage with a preset voltage; increasing the duty cycle of the PWM driving signal to increase a step-up ratio of the driving circuit if the feedback voltage is lower than the preset voltage; decreasing the duty cycle of the PWM driving signal to decrease the step-up ratio of the driving circuit if the feedback voltage is higher than the preset voltage.

In an exemplary embodiment of the invention, the threshold duty cycle corresponds to a maximum duty cycle of the PWM driving signal, and the step of determining whether the period of time during which the PWM driving signal continues being output exceeds the preset period of time comprises: determining whether the duty cycle of the PWM driving signal is increased to the maximum duty cycle; if the duty cycle of the PWM driving signal is increased to the maximum duty cycle, starting to count a duration, wherein the duration is the period of time during which the PWM driving signal with the maximum duty cycle continues being output; determining whether the duration exceeds the preset period of time; and stopping generating the PWM driving signal if the duration exceeds the preset period of time.

In an exemplary embodiment of the invention, the step of determining whether the period of time during which the PWM driving signal with the threshold duty cycle continues being output exceeds the preset period of time further comprises: clearing the count of the duration if the duration does not exceed the preset period of time.

In an exemplary embodiment of the invention, the step of adjusting the duty cycle of the PWM driving signal in response to the feedback voltage further comprises: comparing the feedback voltage with a preset voltage; if the feedback voltage is lower than the preset voltage, decreasing the duty cycle of the PWM driving signal to increase a step-down ratio of the driving circuit; if the feedback voltage is higher than the preset voltage, increasing the duty cycle of the PWM driving signal to decrease the step-down ratio of the driving circuit.

In an exemplary embodiment of the invention, the threshold duty cycle corresponds to a minimum duty cycle of the PWM driving signal, and the step of determining whether the period of time during which the PWM driving signal with the threshold duty cycle continues being output exceeds the preset period of time further comprises: determining whether the duty cycle of the PWM driving signal is decreased to the minimum duty cycle; if the duty cycle of the PWM driving signal is decreased to the minimum duty cycle, starting to count a duration, wherein the duration is the period of time during which the PWM driving signal with the minimum duty cycle continues being output; determining whether the duration exceeds the preset period of time; and stopping generating the PWM driving signal if the duration exceeds the preset period of time.

In an exemplary embodiment of the invention, the step of determining whether the period of time during which the PWM driving signal with the threshold duty cycle continues being output exceeds the preset period of time further comprises: clearing the count of the duration if the duration does not exceed the preset period of time.

Based on the above, the embodiments of the invention disclose an LED driving apparatus and an LED driving method. The LED driving apparatus may determine whether the current leakage phenomenon occurs on the LED load according to the PWM driving signal, wherein when the LED driving apparatus determines that the period of time during which the PWM driving signal with the threshold duty cycle continues being output exceeds the preset period of time, the LED driving apparatus determines that the current leakage phenomenon occurs on the LED load and starts the current leakage protection mechanism, so as to stop supplying power to the LED load and thereby protect the LED load from damages.

In order to enable the above features and advantages of the invention become apparent and understandable, several embodiments are particularly provided below with reference to the drawings and descriptions in detail.

DETAILED DESCRIPTION OF DISCLOSED EMBODIMENTS

Figure 1:
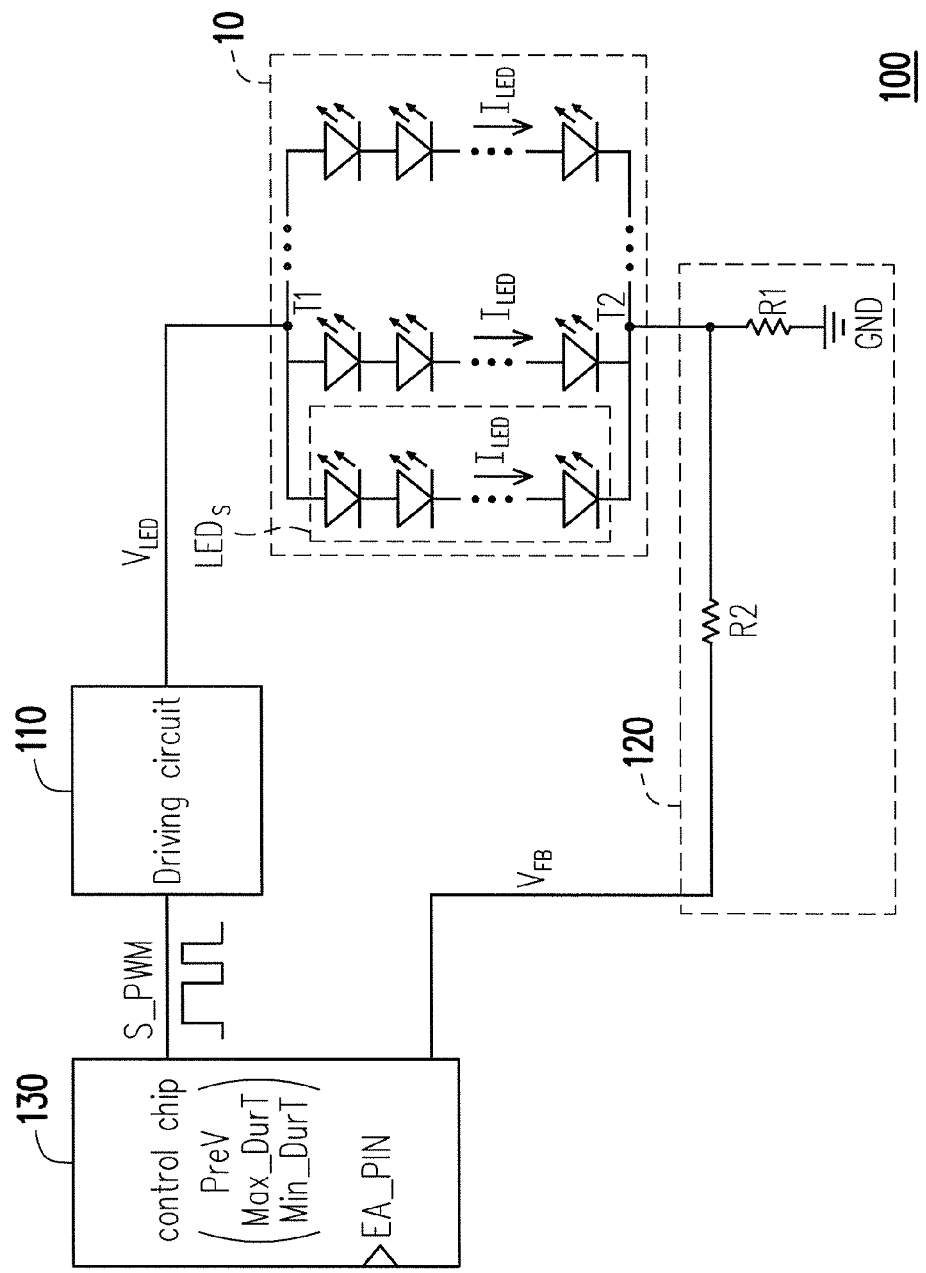
FIG. 1 is a schematic diagram illustrating an LED driving apparatus according to an exemplary embodiment of the invention.

An embodiment of the invention provides an LED driving apparatus and an LED driving method. The LED driving apparatus detects the PWM driving signal to determine whether the current leakage phenomenon occurs on the LED load, wherein when the LED driving apparatus determines that a period of time during which the PWM driving signal with a threshold duty cycle continues being output exceeds a preset period of time, the LED driving apparatus determines that the current leakage phenomenon occurs on the LED load and starts/activates the current leakage protection mechanism, so as to stop generating the PWM driving signal and protect the LED load from damages. In order to make the disclosure more easily to understand, the following embodiments may be really implemented and provided as examples. In addition, the same or similar components/elements/steps are marked by the same or similar reference numbers in the drawings and embodiments.

FIG. 1 is a schematic diagram illustrating an LED driving apparatus according to an exemplary embodiment of the invention. In the embodiment, an LED load 10 is driven by an LED driving apparatus 100, wherein the LED load 10 may be formed by one or more groups of LED strings (LEDs) connected to each other in parallel, and each LED string (LEDs)

may include one or more LEDs serially connected to each other. However, invention is not limited thereto.

With reference to FIG. 1, the LED driving apparatus 100 includes a driving circuit 110, a feedback circuit 120, and a control chip 130. The driving circuit 110 is coupled to the LED load 10 and provides the driving voltage $V_{LED}$ to the anode terminal T1 of the LED load 10 according to the pulse-width modulation driving signal S_PWM generated by the control chip 130. The feedback circuit 120 is coupled to the cathode terminal T2 of the LED load 10 and generates the feedback voltage $V_{FB}$ based on the voltage on the cathode terminal T2 of the LED load. The control chip 130 is coupled to the driving circuit 110 and the feedback circuit 120, wherein the control chip 130 receives the feedback voltage $V_{FB}$ from the feedback circuit 120 and adjusts the duty cycle of the pulse-width modulation driving signal S_PWM in response to the feedback voltage $V_{FB}$. In the embodiment, the feedback circuit 120 is, for instance, the voltage dividing circuit composed of resistors R1 and R2, but the invention is not limited thereto.

Specifically, the driving voltage $V_{LED}$ provided by the driving circuit 110 may generate a potential difference between the two terminals of the LED load 10, so that the LED load 10 generates a driving current $I_{LED}$ which flows through each LED in response to the potential difference. The control chip 130 may receive the feedback voltage $V_{FB}$ of the cathode terminal of the LED load 10 from a feedback pin FB_PIN, so as to detect the magnitude of the driving current $I_{LED}$ which flows through the LED load 10. Therefore, the control chip 130 may adjust the duty cycle of the output pulse-width modulation driving signal S_PWM based on the magnitude of the feedback voltage $V_{FB}$, so as to adjust the step-up/step-down ratio corresponding to the driving circuit 110, and thereby the LED load 10 emits light when it is operated at a fixed driving current $I_{LED}$.

Generally speaking, if the LED load 10 is operated in a normal manner, the control chip 130 may compare the received feedback voltage $V_{FB}$ with a preset voltage PreV. When the feedback voltage $V_{FB}$ is higher than the preset voltage PreV, the control chip 130 determines the driving current $I_{LED}$ is greater than the preset current, so that the driving circuit 110 decreases the step-up/step-down ratio in order to decrease the driving current $I_{LED}$ of the LED load 10. On the contrary, when the feedback voltage $V_{FB}$ is lower than the preset voltage PreV, the control chip 130 determines the driving current $I_{LED}$ is less than the preset current, so that the driving circuit 110 increases the step-up/step-down ratio in order to increase the driving current $I_{LED}$ of the LED load 10.

In the above driving method with feedback adjustment, the fixed impedance of the LED load 10 allows the control chip 130 to determine the magnitude of the driving current $I_{LED}$ by means of the voltage on the cathode terminal of the LED load. However, when the current leakage phenomenon occurs on the LED load 10, the LED load 10 cannot be adjusted in response to the magnitude of the driving current $I_{LED}$. What is worse, the above driving method with feedback adjustment may cause failure or damages to the LED load 10.

Figure 2:
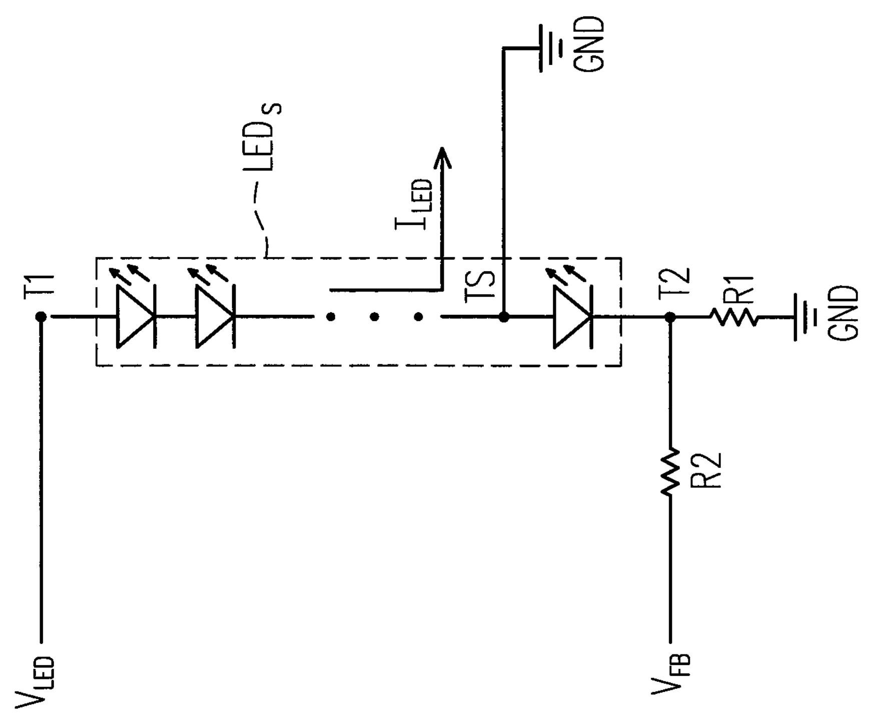
FIG. 2 is a schematic diagram illustrating a current leakage phenomenon occurs on an LED load.

For example, FIG. 2 is a schematic diagram illustrating that the current leakage phenomenon occurs on the LED load 10. With reference to FIG. 1 and FIG. 2, in the LED load 10, if a terminal TS of the serially connected LED string LEDs is short to ground due to the broken lines or abnormal insulation (but not limited thereto), the current leakage phenomenon occurs on the LED load 10. More specifically, the driving current $I_{LED}$ of the LED string LEDs does not flow through the cathode terminal T2 of the LED load 10 and the resistor R1 but through the terminal TS of the short circuit to a ground terminal GND, rendering no voltage drop at the cathode terminal T2 of the LED load 10. Therefore, the cathode terminal T2 and the ground terminal GND have the same voltage level (e.g., 0 V), and the feedback voltage $V_{FB}$ may also have the same voltage level.

In the normal driving method with feedback adjustment, when the current leakage phenomenon occurs on the LED load 10, the control chip 130 may control the step-up/step-down ratio of the driving circuit 110 in response to the excessively low driving voltage of the cathode terminal and increase the driving current $I_{LED}$. However, since the cathode voltage of the LED load 10 does not increase with the increase in the driving current $I_{LED}$ at this time, the control chip 130 may continuously adjust the duty cycle of the pulse-width modulation driving signal S_PWM until achieving a threshold duty cycle (e.g., the maximum/minimum duty cycle) and may continue outputting the pulse-width modulation driving signal S_PWM with the threshold duty cycle, so as to control the driving circuit 110. Under such a condition, the driving circuit 110 may change the voltage based on the maximum step-up/step-down ratio in response to the pulse-width modulation driving signal S_PWM with the threshold duty cycle. The driving voltage $V_{LED}$ actually applied to the LED load 10 still does not increase but decreases due to the current leakage of the LED load 10. Thereby, the LED load 10 continuously operates at a large current and emits light, and the LED load 10 may very likely be burned because the current is overly large.

In order to avoid the above problems caused by the current leakage phenomenon, the control chip 130 provided in the embodiment may further determine whether the current leakage phenomenon occurs on the LED load 10 by detecting whether the output of the driving pulse-width modulation driving signal S_PWM is abnormal or not. The control chip 130 activates the current leakage protection mechanism when the current leakage phenomenon occurs on the LED load 10, such that the driving circuit 110 stops supplying power to the LED load 10, and that the LED load 10 can be protected from damages.

More specifically, in this embodiment, when the duty cycle of the pulse-width modulation driving signal S_PWM achieves the threshold duty cycle, the control chip 130 may start to count the duration during which the pulse-width modulation driving signal S_PWM with the threshold duty cycle continues being output. If the control chip 130 determines the duration exceeds the preset period of time, the control chip 130 determines the current leakage phenomenon occurs on the LED load 10, stops generating the pulse-width modulation driving signal S_PWM, and causes the driving circuit 110 to stop supplying power. The specific operations and the current leakage protection mechanisms of the LED driving apparatus 100 are further described hereinafter in case that different types of driving circuits are applied to the LED driving apparatus 100.

In an embodiment, if the driver circuit 110 is the boost converter or the buck-boost converter, the step-up ratio of the driving circuit 110 and the duty cycle of the pulse-width modulation driving signal S_PWM are proportional to each other; that is, the greater the duty cycle of the pulse-width modulation driving signal S_PWM, the greater the step-up ratio of the driving circuit 110. In other words, in case that the driving circuit 110 is the boost converter or the buck-boost converter according to an embodiment, and if the feedback voltage $V_{FB}$ is lower than the preset voltage PreV, the control chip 130 increases the duty cycle of the pulse-width modulation driving signal S_PWM to increase the step-up ratio of the driving circuit. On the contrary, if the feedback voltage $V_{FB}$ is higher than the preset voltage PreV, the control chip 130 decreases the duty cycle of the pulse-width modulation driving signal S_PWM to decrease the step-up ratio of the driving circuit 110.

Figure 3A:
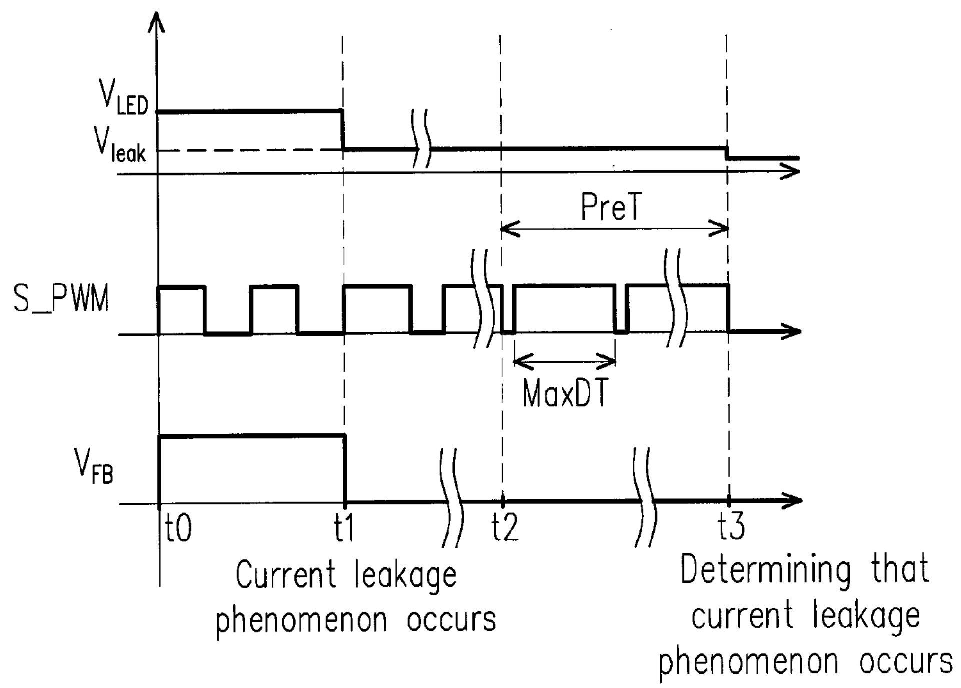
FIG. 3A to FIG. 3C are schematic diagrams illustrating signal waveforms in an LED driving apparatus to which different driving circuits are applied.

More particularly, FIG. 3A shows the signal waveforms according to an exemplary embodiment, wherein the boost converter serves as the driving circuit 110. With reference to FIG. 1 and FIG. 3A, first, the LED load 10 is in a normal operation state at the duration between t0 and t1. Although the duty cycle of the pulse-width modulation driving signal S_PWM may be slightly adjusted based on the feedback voltage $V_{FB}$, the driving voltage $V_{LED}$ may substantially remain at a particular voltage level, which allows the driving current $I_{LED}$ to be fixed.

When the current leakage phenomenon occurs on the LED load 10 at the time t1, the voltage level of the feedback voltage $V_{FB}$ may quickly decrease to the ground potential, which causes the control chip 130 to gradually increase the duty cycle of pulse-width modulation driving signal S_PWM in response to the feedback voltage $V_{FB}$. However, the driving voltage $V_{LED}$ actually applied to the LED load 10 drops to the leakage level $V_{leak}$ due to the current leakage phenomenon.

When the duty cycle of the pulse-width modulation driving signal S_PWM is raised to the maximum duty cycle MaxDT at the time t2, the control chip 130 may start to count the duration Max_DurT and continue outputting the pulse-width modulation driving signal S_PWM with the maximum duty cycle MaxDT.

When the control chip 130 determines the count of duration Max_DurT exceeds a preset period of time PreT at the time t3, the control chip 130 activates the current leakage protection mechanism to stop generating the pulse-width modulation driving signal S_PWM, so that the driving circuit 110 stops supplying power to the LED load 10 and latches the driving voltage $V_{LED}$ of the LED load 10 to be below the voltage level of the input power of the drive circuit 110.

Further, in order to avoid erroneous determination, if the duty cycle of the pulse-width modulation driving signal S_PWM is adjusted to be lower than the maximum duty cycle MaxDT in the counted duration Max_DurT of the control chip 130 (i.e., the time t2 to the time t3), the control chip 130 determines that the current leakage phenomenon does not actually occur on the LED load 10, and that the LED load 10 may merely operate in the overloaded state. In this case, the control chip 130 may clear the previous count of duration Max_DurT to avoid the current leakage protection mechanism from being triggered by mistake.

Figure 3B:
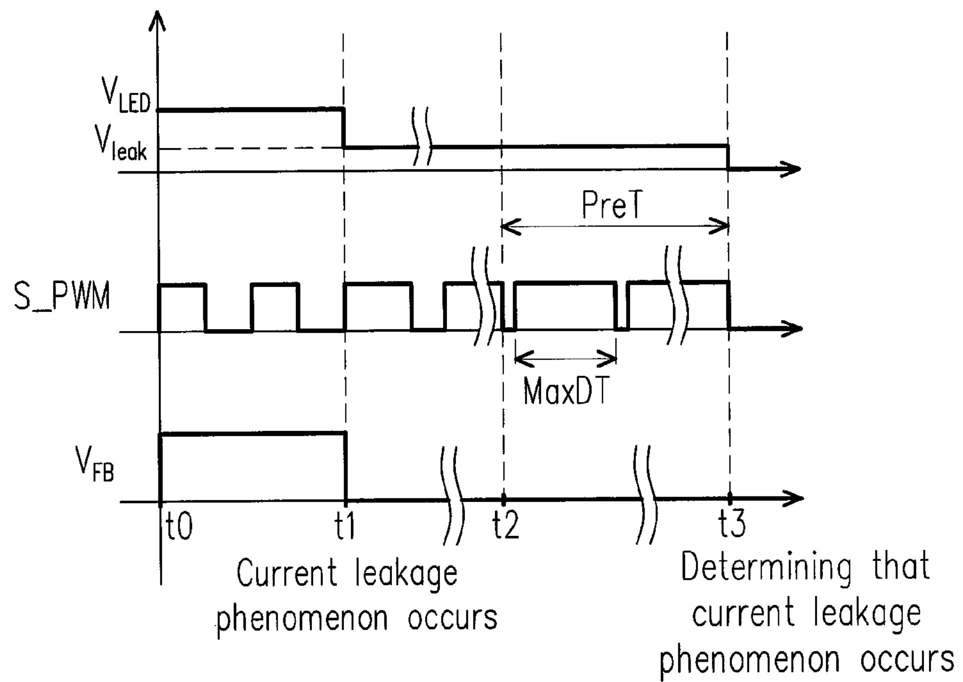

FIG. 3B shows the signal waveforms according to an exemplary embodiment, wherein the buck-boost converter serves as the driving circuit 110. The signal waveform provided in this embodiment and the preceding signal waveform illustrated in FIG. 3A are the same in substance. The main difference therebetween lies in that when the current leakage protection mechanism of the driving circuit 110 with the boost converter is triggered, the driving voltage $V_{LED}$ may be latched at the input voltage level of the driving circuit 110; when the current leakage protection mechanism of the driving circuit 110 with the buck-boost converter is triggered, the driving voltage $V_{LED}$ may be latched at the ground potential (e.g., 0V). Apart from the above, descriptions of the similar or identical remaining portions may be deduced from the foregoing descriptions provided in the embodiment illustrated in FIG. 3A and thus will be omitted hereinafter.

In another embodiment, if the driving circuit 110 is a buck converter, the step-up ratio of the driving circuit 110 and the duty cycle of the pulse-width modulation driving signal S_PWM are inversely proportional to each other; that is, the greater the duty cycle of the pulse-width modulation driving signal S_PWM, the smaller the step-down ratio of the driving circuit 110. In other words, in case that the driving circuit 110 is the buck converter according to an embodiment, and if the feedback voltage $V_{FB}$ is lower than the preset voltage PreV, the control chip 130 decreases the duty cycle of the pulse-width modulation driving signal S_PWM to increase the step-down ratio of the driving circuit 110. On the contrary, if the feedback voltage $V_{FB}$ is higher than the preset voltage PreV, the control chip 130 increases the duty cycle of the pulse-width modulation driving signal S_PWM to decrease the step-down ratio of the driving circuit 110.

Figure 3C:
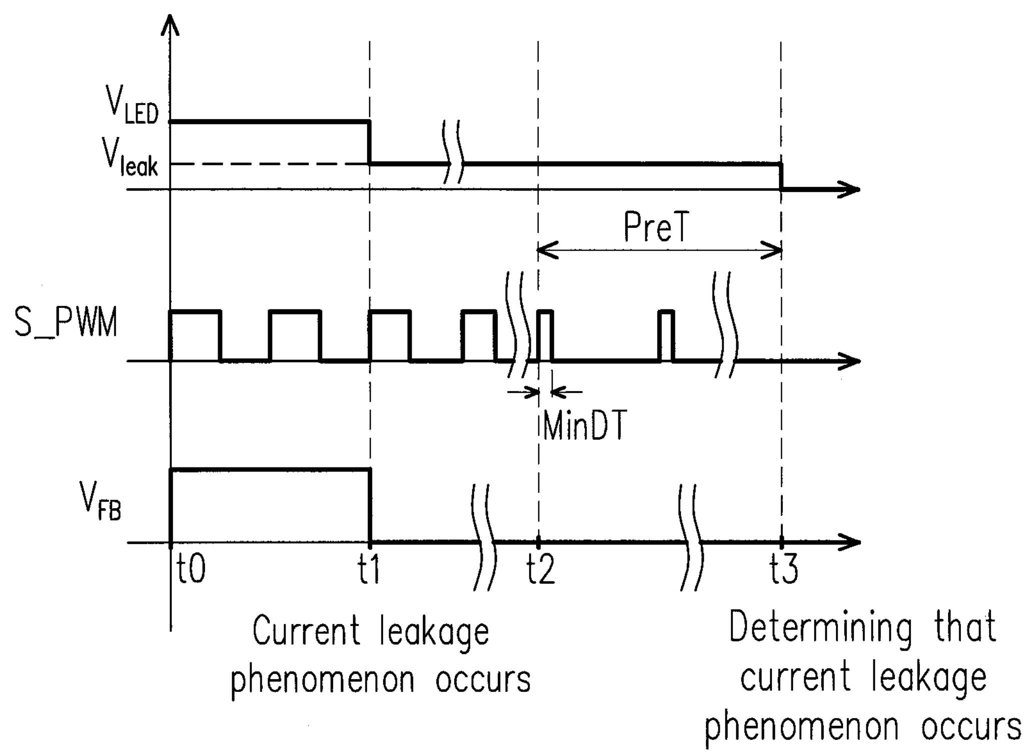

More particularly, FIG. 3C shows the signal waveforms according to an exemplary embodiment, wherein the buck converter serves as the driving circuit 110. With reference to FIG. 1 and FIG. 3B, first, the LED load 10 is in a normal operation state in the duration between t0 and t1. Although the duty cycle of the pulse-width modulation driving signal S_PWM may be slightly adjusted based on the feedback voltage $V_{FB}$, the driving voltage $V_{LED}$ may substantially remain at a particular voltage level, which allows the driving current $I_{LED}$ to be fixed.

When the current leakage phenomenon occurs on the LED load 10 at the time t1, the voltage level of the feedback voltage $V_{FB}$ may quickly decrease to the ground potential, and thereby the control chip 130 gradually increases the duty cycle of pulse-width modulation driving signal S_PWM in response to the feedback voltage $V_{FB}$. However, the driving voltage $V_{LED}$ actually applied to the LED load 10 drops to the leakage level $V_{leak}$ due to the current leakage phenomenon.

When the duty cycle of the pulse-width modulation driving signal S_PWM is decreased to the minimum duty cycle MinDT at the time t2, the control chip 130 may start to count the duration Min_DurT and continue outputting the pulse-width modulation driving signal S_PWM with the minimum duty cycle MinDT.

When the control chip 130 determines the count of duration Min_DurT exceeds a preset period of time PreT at the time t3, the control chip 130 activates the current leakage protection mechanism to stop generating the pulse-width modulation driving signal S_PWM, so that the driving circuit 110 stops supplying power to the LED load 10 and latches the driving voltage $V_{LED}$ of the LED load 10 to be at the ground potential.

Further, in the present embodiment which is similar to the embodiment of FIG. 3A, to avoid the erroneous determination, if the duty cycle of the pulse-width modulation driving signal S_PWM is adjusted to be greater than the minimum duty cycle MinDT in the counted duration Min_DurT of the control chip 130 (i.e., the time t2 to the time t3), the control chip 130 determines that the current leakage phenomenon does not actually occur on the LED load 10, and that the LED load 10 may merely operate in the overloaded state. In this case, the control chip 130 may clear the previous count of duration Min_DurT to avoid the current leakage protection mechanism from being triggered by mistake.

In addition, the control chip 130 described in this embodiment further comprises a reset pin EA_PIN. The reset pin EA_PIN may be triggered, which causes the control chip 130 to stop generating the pulse-width modulation driving signal S_PWM (i.e., the control chip 130 in the output latched state) and re-start to generate the pulse-width modulation driving signal S_PWM. Accordingly, after the current leakage phenomenon of the LED load 10 is eliminated, the LED load 10 may be driven by the LED driving apparatus 100 again.

Figure 4:
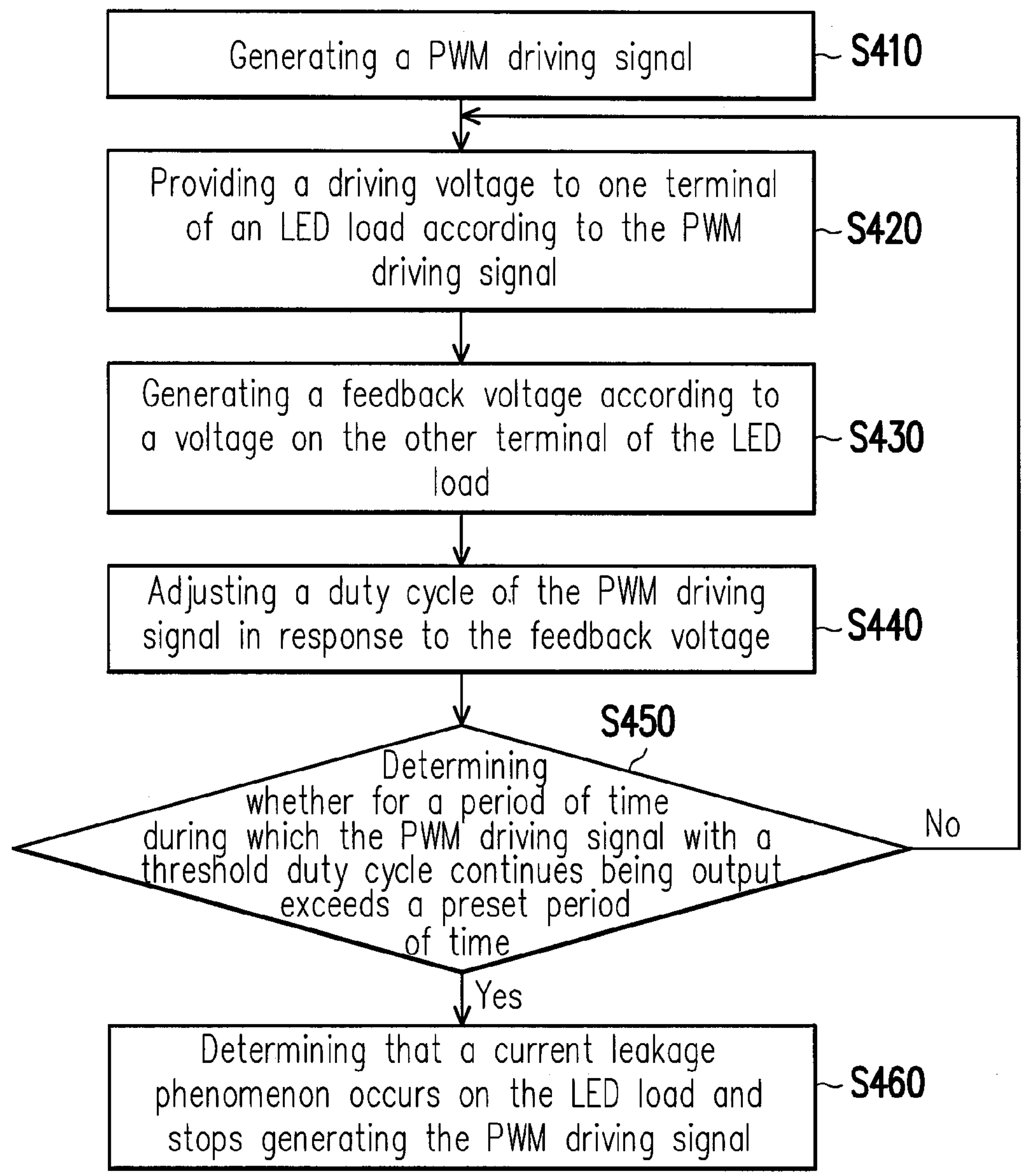
FIG. 4 is a flow chart illustrating an LED driving method with a current leakage protection mechanism according to an exemplary embodiment of the invention.

FIG. 4 is a flow chart illustrating an LED driving method with a current leakage protection mechanism according to an exemplary embodiment of the invention. In the embodiment, the LED driving method may be applied to the LED driving apparatus 100 described in the embodiment as shown in FIG. 1, and the LED load 10 provided in the embodiment as shown in FIG. 1 is driven by applying the LED driving method.

With reference to FIG. 4 which is a flow chart illustrating an LED driving method according to an exemplary embodiment, first, the LED driving apparatus generates the PWM driving signal (step S410) and provides the driving voltage to one terminal of the LED load according to the PWM driving signal (step S420). The LED driving apparatus then generates the feedback voltage according to the voltage on the other terminal of the LED load (step S430) and adjusts the duty cycle of the PWM driving signal in response to the feedback voltage (step S440). During the step S410 to the step S440, the LED driving apparatus further determines whether a period of time during which the PWM driving signal with a threshold duty cycle continues being output exceeds a preset period of time (step S450). If yes, the LED driving apparatus determines that the current leakage phenomenon occurs on the LED load and stops generating the PWM driving signal (step S460), so as to stop supplying power to the LED load; on the contrary, if no, the process returns to the step S420, so that the LED driving apparatus repeats the above driving steps.

Figure 5:
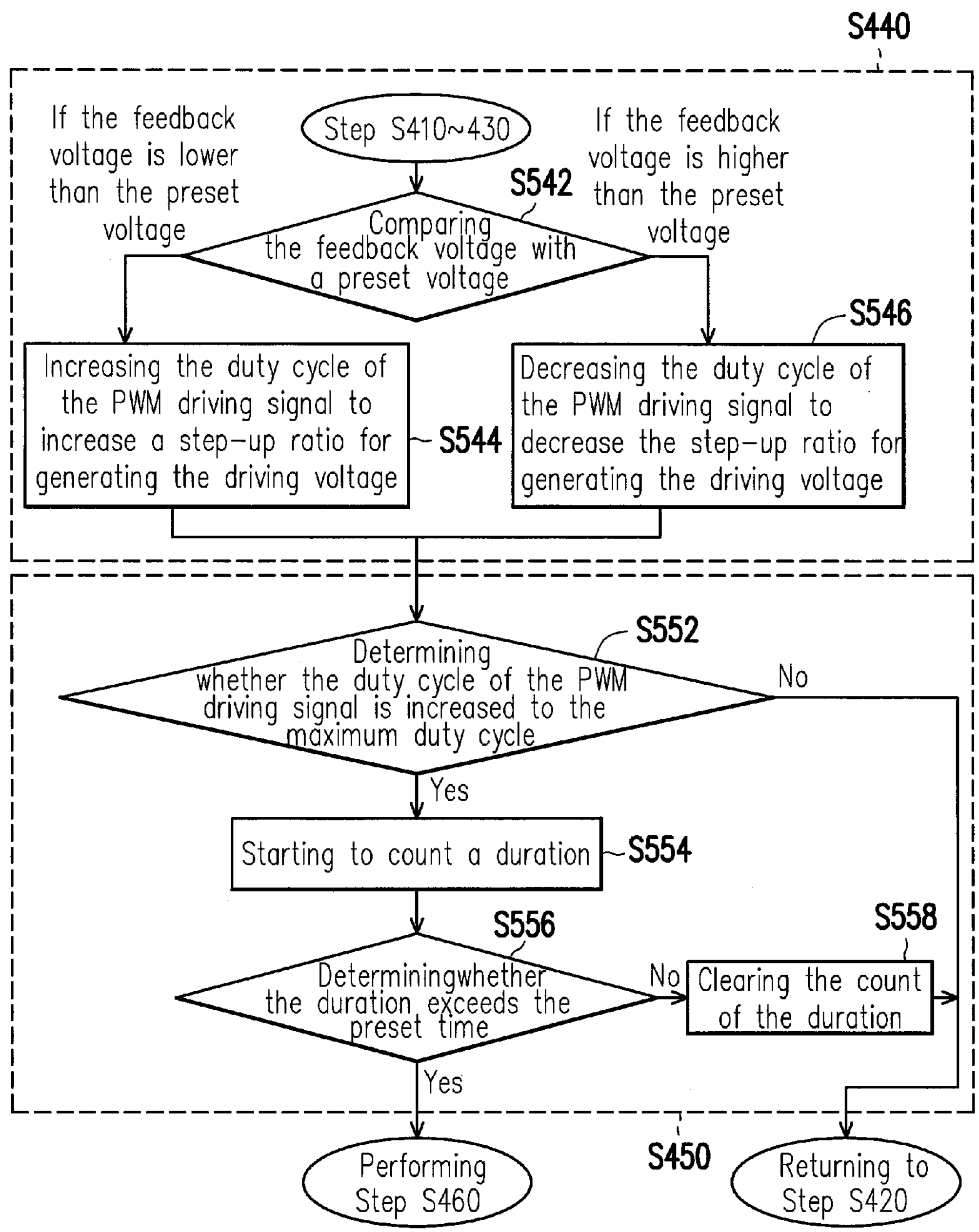
FIG. 5 is a flow chart illustrating an LED driving method according to the exemplary embodiment shown in FIG. 4.

More specifically, the specific steps of LED driving method shown in FIG. 4 may be applicable in FIG. 5, given that the LED load is driven by the LED driving apparatus to which the boost converter or the buck-boost converter is applied. FIG. 5 is a flow chart illustrating an LED driving method according to the exemplary embodiment illustrated in FIG. 4.

With reference to FIG. 5, in the embodiment, the LED driving apparatus adjusts the duty cycle of the PWM driving signal in response to the feedback voltage (step S440), which may be achieved by the following steps: comparing the feedback voltage with the preset voltage (step S542); if the feedback voltage is lower than the preset voltage, increasing the duty cycle of the PWM driving signal to increase the step-up ratio for generating the driving voltage (step S544); if the feedback voltage is higher than the preset voltage, decreasing the duty cycle of the PWM driving signal to decrease the step-up ratio for generating the driving voltage (step S546).

Furthermore, in step S450, the LED driving apparatus determines whether the duty cycle of the PWM driving signal is increased to the maximum duty cycle (step S552). If yes, the LED driving apparatus starts to count a duration, and the duration is a period of time during which the PWM driving signal with a maximum duty cycle continues being output by the LED driving apparatus (step S554); on the contrary, if no, return to step S420. Subsequently, the LED driving apparatus further determines whether said duration exceeds the preset period of time (step S556). If yes, the LED driving apparatus determines that the current leakage phenomenon occurs on the LED load and performs step S460; on the contrary, if no, the count of the duration is cleared (step S558), and then go back to step S420.

Figure 6:
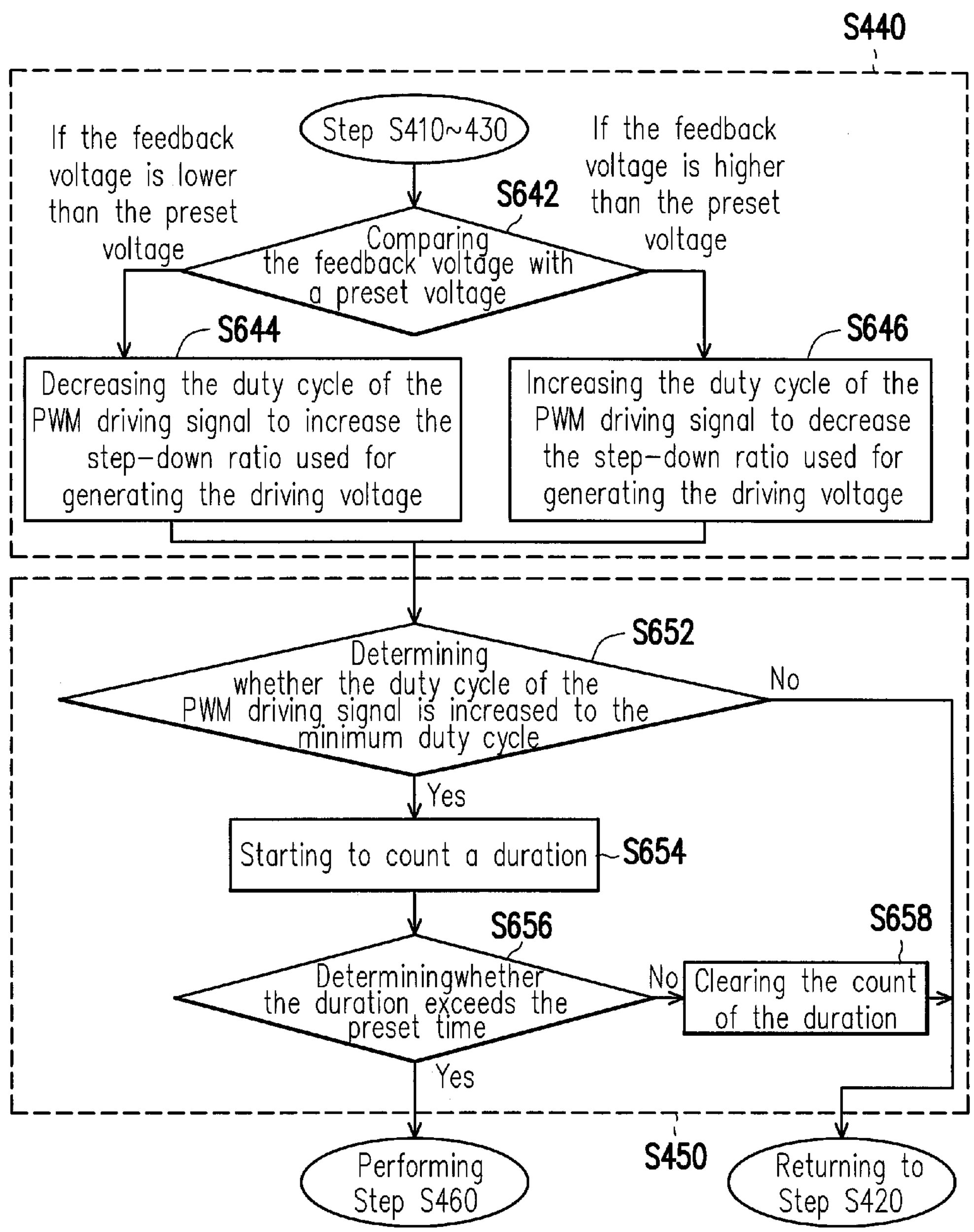
FIG. 6 is a flow chart illustrating an LED driving method according to another exemplary embodiment shown in FIG. 4.

On the other hand, the specific steps of LED driving method shown in FIG. 4 may be applicable in FIG. 6, given that the LED load is driven by the LED driving apparatus to which the buck converter is applied. FIG. 6 is a flow chart illustrating an LED driving method according to another exemplary embodiment of FIG. 4.

With reference to FIG. 6, in the embodiment, the LED driving apparatus adjusts the duty cycle of the PWM driving signal in response to the feedback voltage (step S440), which may be achieved by the following steps: comparing the feedback voltage with the preset voltage (step S642); if the feedback voltage is lower than the preset voltage, decreasing the duty cycle of the PWM driving signal to increase the step-down ratio for generating the driving voltage (step S644); if the feedback voltage is higher than the preset voltage, increasing the duty cycle of the PWM driving signal to decrease the step-down ratio for generating the driving voltage (step S646).

Furthermore, in step S450, the LED driving apparatus determines whether the duty cycle of the PWM driving signal is decreased to the minimum duty cycle (step S652). If yes, the LED driving apparatus starts to count a duration, and the duration is a period of time during which the PWM driving signal with a minimum duty cycle continues being output by the LED driving apparatus (step S654); on the contrary, if no, return to step S420. Subsequently, the LED driving apparatus further determines whether said duration exceeds the preset period of time (step S656). If yes, the LED driving apparatus determines that the current leakage phenomenon occurs on the LED load and performs step S460; on the contrary, if no, the count of the duration is cleared (step S658), and then go back to step S420.

The LED driving method illustrated in FIG. 4 to FIG. 6 is sufficiently taught and supported by the descriptions in the embodiments illustrated in FIG. 1 to FIG. 3B, so that the similar or identical descriptions will not be provided hereinafter.

To sum up, the embodiments of the invention provide an LED driving apparatus and an LED driving method. The LED driving apparatus may determine whether the current leakage phenomenon occurs on the LED load according to the PWM driving signal; when the LED driving apparatus determines the period of time during which the PWM driving signal with the threshold duty cycle continues being output exceeds the preset period of time, the LED driving apparatus determines that the current leakage phenomenon occurs on the LED load and activates the current leakage protection mechanism, so as to stop supplying power to the LED load for the purpose of protecting the LED load from damages.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A light emitting diode driving apparatus configured to drive a light emitting diode load, the driving apparatus comprising:

a driving circuit, coupled to the light emitting diode load, the driving circuit providing a driving voltage to one terminal of the light emitting diode load according to a pulse-width modulation driving signal;

a feedback circuit, coupled to the other terminal of the light emitting diode load, the feedback circuit generating a feedback voltage according to a voltage on the other terminal of the light emitting diode load; and a control chip, coupled to the driving circuit and the feedback circuit, the control chip generating the pulse-width modulation driving signal and adjusting a duty cycle of the pulse-width modulation driving signal in response to the feedback voltage, wherein if the control chip determines that the control chip continues outputting the pulse-width modulation driving signal with a threshold duty cycle for a period of time, and the period of time exceeds a preset period of time, the control chip determines a current leakage phenomenon occurs on the light emitting diode load and stops generating the pulse-width modulation driving signal.

2. The light emitting diode driving apparatus of claim 1, wherein the light emitting diode load at least comprises a light emitting diode string, and either terminal of the light emitting diode string is short to ground when the current leakage phenomenon occurs on the light emitting diode load, such that the control chip adjusts the duty cycle of the pulse-width modulation driving signal to the threshold duty cycle in response to the feedback voltage.

3. The light emitting diode driving apparatus of claim 1, wherein the driving circuit is a boost converter or a buck-boost converter, the control chip compares the feedback voltage with a preset voltage, if the feedback voltage is lower than the preset voltage, the control chip increases the duty cycle of the pulse-width modulation driving signal to increase a step-up ratio of the driving circuit; if the feedback voltage is higher than the preset voltage, the control chip decreases the duty cycle of the pulse-width modulation driving signal to decrease the step-up ratio of the driving circuit.

4. The light emitting diode driving apparatus of claim 3, wherein the threshold duty cycle corresponds to a maximum duty cycle of the pulse-width modulation driving signal, when the duty cycle of the pulse-width modulation driving signal is increased to the maximum duty cycle, the control chip starts to count a duration, and the duration is the period of time during which the control chip continues outputting the pulse-width modulation driving signal with the maximum duty cycle.

5. The light emitting diode driving apparatus of claim 4, wherein if the control chip determines that the duration exceeds the preset period of time, the control chip stops generating the pulse-width modulation driving signal; if the control chip determines that the duration does not exceed the preset period of time, the control chip clears the count of the duration.

6. The light emitting diode driving apparatus of claim 1, wherein the driving circuit is a buck converter, the control chip compares the feedback voltage with a preset voltage, if the feedback voltage is lower than the preset voltage, the control chip decreases the duty cycle of the pulse-width modulation driving signal to increase a step-down ratio of the driving circuit; if the feedback voltage is higher than the preset voltage, the control chip increases the duty cycle of the pulse-width modulation driving signal to decrease the step-down ratio of the driving circuit.

7. The light emitting diode driving apparatus of claim 6, wherein the threshold duty cycle corresponds to a minimum duty cycle of the pulse-width modulation driving signal, when the duty cycle of the pulse-width modulation driving signal is decreased to the minimum duty cycle, the control chip starts to count a duration, and the duration is a period of time during which the control chip continues outputting the pulse-width modulation driving signal with the minimum duty cycle.

8. The light emitting diode driving apparatus of claim 7, wherein if the control chip determines that the duration exceeds the preset period of time, the control chip stops generating the pulse-width modulation driving signal; if the control chip determines that the duration does not exceed the preset period of time, the control chip clears the count of the duration.

9. The light emitting diode driving apparatus of claim 1, wherein the control chip comprises a reset pin, when the control chip stops generating the pulse-width modulation driving signal based on the determination of the current leakage phenomenon occurring on the light emitting diode load, the reset pin is triggered, such that the control chip re-starts to generate the pulse-width modulation driving signal.

10. A light emitting diode driving method with a current leakage protection mechanism, the light emitting diode driving method being adapted to a light emitting diode load and comprising:

generating a pulse-width modulation driving signal;

providing a driving voltage to one terminal of the light emitting diode load according to the pulse-width modulation driving signal;

generating a feedback voltage according to a voltage on the other terminal of the light emitting diode load;

adjusting a duty cycle of the pulse-width modulation driving signal in response to the feedback voltage; and determining whether a period of time during which the pulse-width modulation driving signal with a threshold duty cycle continues being output exceeds a preset period of time, if yes, determining that the current leakage phenomenon occurs on the light emitting diode load and stopping generating the pulse-width modulation driving signal.

11. The light emitting diode driving method of claim 10, wherein the light emitting diode load at least comprises a light emitting diode string, and either terminal of the light emitting diode string is short to ground when the current leakage phenomenon occurs on the light emitting diode load, such that the control chip adjusts the duty cycle of the pulse-width modulation driving signal to the threshold duty cycle in response to the feedback voltage.

12. The light emitting diode driving method of claim 10, wherein the step of adjusting the duty cycle of the pulse-width modulation driving signal in response to the feedback voltage comprises:

comparing the feedback voltage with a preset voltage;

if the feedback voltage is lower than the preset voltage, increasing the duty cycle of the pulse-width modulation driving signal to increase a step-up ratio for generating the driving voltage; and if the feedback voltage is higher than the preset voltage, decreasing the duty cycle of the pulse-width modulation driving signal to decrease the step-up ratio.

13. The light emitting diode driving method of claim 11, wherein the threshold duty cycle corresponds to a maximum duty cycle of the pulse-width modulation driving signal, and the step of determining whether the period of time during which the pulse-width modulation driving signal continues being output exceeds the preset period of time comprises:

determining whether the duty cycle of the pulse-width modulation driving signal is increased to the maximum duty cycle;

if the duty cycle of the pulse-width modulation driving signal is increased to the maximum duty cycle, starting to count a duration, wherein the duration is the period of time during which the pulse-width modulation driving signal with the maximum duty cycle continues being output;

determining whether the duration exceeds the preset period of time; and stopping generating the pulse-width modulation driving signal if the duration exceeds the preset period of time.

14. The light emitting diode driving method of claim 13, wherein the step of determining whether the period of time during which the pulse-width modulation driving signal with the threshold duty cycle continues being output exceeds the preset period of time further comprises:

clearing the count of the duration if the duration does not exceed the preset period of time.

15. The light emitting diode driving method of claim 10, wherein the step of adjusting the duty cycle of the pulse-width modulation driving signal in response to the feedback voltage further comprises:

comparing the feedback voltage with a preset voltage;

if the feedback voltage is lower than the preset voltage, decreasing the duty cycle of the pulse-width modulation driving signal to increase a step-down ratio for generating the driving voltage; and if the feedback voltage is higher than the preset voltage, increasing the duty cycle of the pulse-width modulation driving signal to decrease the step-down ratio.

16. The light emitting diode driving method of claim 15, wherein the threshold duty cycle corresponds to a minimum duty cycle of the pulse-width modulation driving signal, and the step of determining whether the period of time during which the pulse-width modulation driving signal with the threshold duty cycle continues being output exceeds the preset period of time further comprises:

determining whether the duty cycle of the pulse-width modulation driving signal is decreased to the minimum duty cycle;

if the duty cycle of the pulse-width modulation driving signal is decreased to the minimum duty cycle, starting to count a duration, wherein the duration is the period of time during which the pulse-width modulation driving signal with the minimum duty cycle continues being output;

determining whether the duration exceeds the preset period of time; and stopping generating the pulse-width modulation driving signal if the duration exceeds the preset period of time.

17. The light emitting diode driving method of claim 16, wherein the step of determining whether the period of time during which the pulse-width modulation driving signal with the threshold duty cycle continues being output exceeds the preset period of time further comprises:

clearing the count of the duration if the duration does not exceed the preset period of time.

* * * * *